Patented Aug. 7, 1951

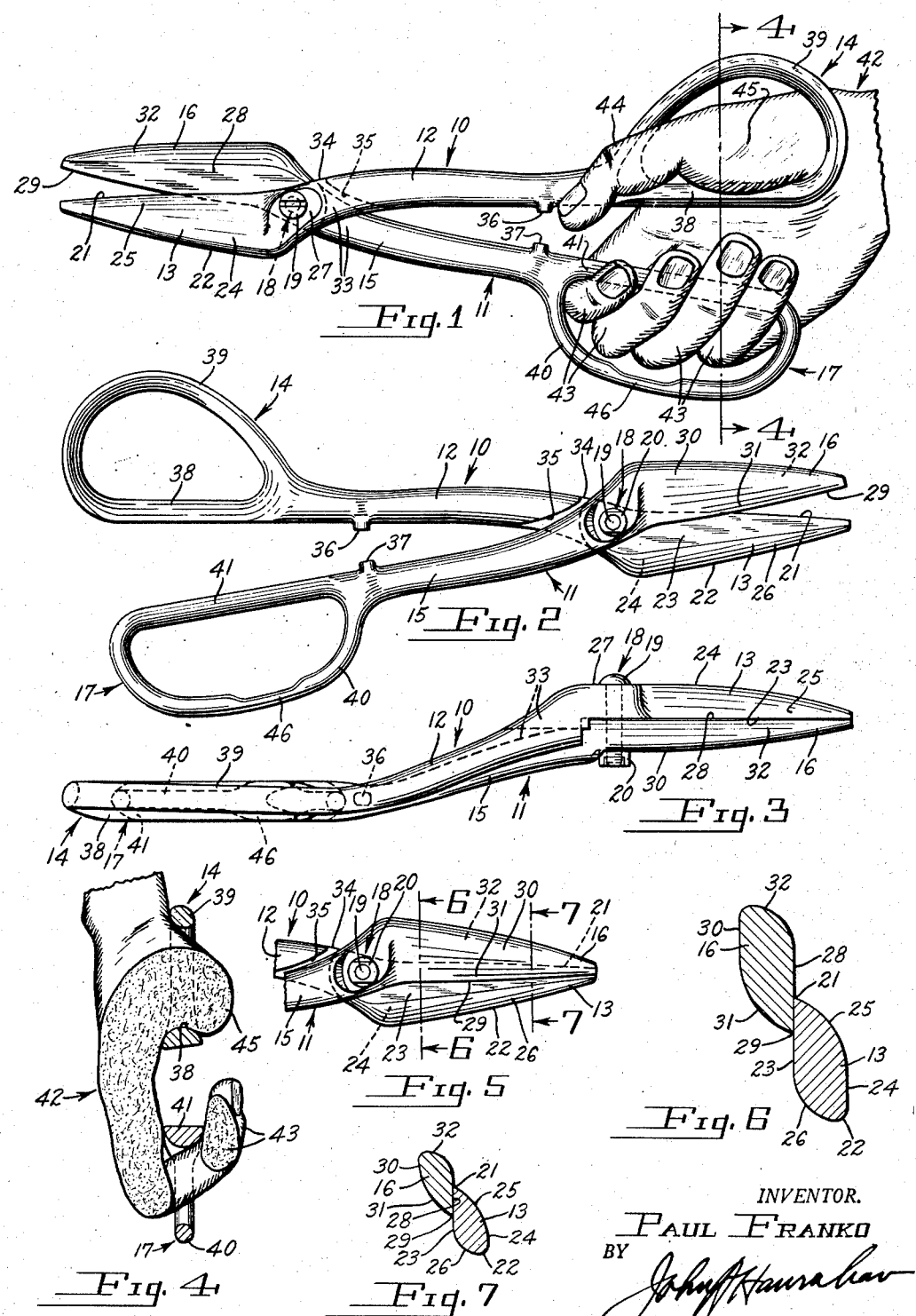
Aug. 7, 1951 — P. FRANKO — 2,563,461
SHEARS
Filed April 1, 1949

2,563,461

UNITED STATES PATENT OFFICE 2,563,461

SHEARS

Paul Franko, Devon, Conn.

Application April 1, 1949, Serial No. 84,892

2 Claims. (Cl. 30—257)

This invention relates to new and useful improvements in shears and has particular relation to a shear adapted for the making of straight and either long or short cuts in sheet metal.

An object of the invention is to provide an improved shear adapted to be gripped in such manner as to provide for manipulation of the same by the full strength of the hand of a user and not merely by a few fingers and the thumb.

Another object is to provide a shear adapted for use in making straight cuts in or through sheet metal, whether such cuts be relatively short in the form of slits from the edge of a sheet metal piece or in the form of relatively long cuts for the entire length or width of the sheet metal piece.

A further object is to provide a shear having improved construction of blades giving great strength and shearing power.

Yet another object is to provide a shear having an improved construction whereby the shear is adapted for long continuous use without undue tiring of the user, the blade and handle construction providing a shear adapted for cutting of relatively heavy gauge metal and the general construction providing for protection of the hands of the user.

Other objects and advantages of the invention will become apparent from a consideration of the following detailed description taken in connection with the accompanying drawing wherein a satisfactory embodiment of the invention is shown. However, it is to be understood that the invention is not limited to the details disclosed but includes all such variations and modifications as fall within the spirit of the invention and the scope of the appended claims.

In the drawing:

Fig. 1 is a side elevational view showing the shear of the invention as held by an operator;

Fig. 2 is an elevational view showing the other side of the shear;

Fig. 3 is an edge elevational view of the improved shear;

Fig. 4 is a sectional view as along the line 4—4 of Fig. 1;

Fig. 5 is an elevational view of the blade portion of the shear from the same side as Fig. 2, and showing the blades closed;

Fig. 6 is a sectional view on an enlarged scale, showing the blades of the shear in closed relation, the view being taken along the line 6—6 of Fig. 5; and Fig. 7 is a view similar to Fig. 6 but taken along the line 7—7 of Fig. 5.

Referring in detail to the drawing, my improved shear comprises a pair of members 10 and 11. The member 10 comprises a shank 12 having at one end a blade 13 and at its other end a handle 14 in the form of a loop. Similarly, the member 11 consists of a shank 15 having a blade 16 at one end and having a handle 17 at its opposite end, said handle also being in the form of a loop. The members 10 and 11 are arranged in crossed relation and at their place of crossing are connected by a pivot means 18 comprising a bolt 19 passing through the members and a nut 20 securing said bolt in place.

Blade 13 includes a straight inner cutting edge 21 and a longitudinally tapered transversely rounded outer edge 22. Further, this blade transversely includes a flat inner side 23 the upper edge of which is the cutting edge 21. Also considered transversely, the blade includes a flat outer surface portion 24 substantially parallel with the surface portion 23 and then the outer surface of the blade 25 curves upwardly and inwardly and terminates in the edge 21. The bottom edge of the blade beyond the flat 23 of the inner side curves downwardly and outwardly as at 26 thus providing a blade of substantial cross section whether in its inner portion as shown by the section of Fig. 6 or toward its tip as shown by the section of Fig. 7. Just inwardly of the surface portions 24 and 25 of the blade 13, the member 10 is externally flatted as at 27 and this flat is of course opposite and parallel with the inner or rear portion of the flat surface 23 of the blade.

Somewhat similarly, the blade 16 includes a flat inner surface 28 one longitudinal edge 29 of which is straight and comprises the cutting edge of the blade. The outer surface of blade 16 includes a flat surface portion 30 substantially parallel with the flat inner surface portion 28 and then this surface portion 30 leads into a curved surface portion 31 terminating in the cutting edge 29. The portion of the blade opposite the edge 29 or remote therefrom is also curved as at 32 and this curve terminates in the flats 28 and 30, respectively, providing a blade of substance including a substantial amount of material whereby it is rigid and of great strength and yet having a good cutting edge 29. Longitudinally, the edge 32 of blade 16 is tapered as is the edge 22 of blade 13 whereby said blades are of diminishing height toward their free ends.

In the assembly, the pivoted means 18 secures the inner portion of the flat 28 against the inner portion of the flat 23 of the blades 16 and 13, respectively, and it will be understood that the members 10 and 11 are to be pivoted relatively on the bolt 19 opening the blades as suggested in Figs. 1 and 2 and closing the blades into overlapping relation as in Figs. 5–7. Preferably, the flats 23 and 28 of the blades slide on one another.

Beginning at or just rearwardly of the pivoted means 18, the shanks 12 and 15 are curved laterally as best shown at 33 in Fig. 3. This is a slight curvature but is sufficient to dispose the handle loops 14 and 17 in the same plane but in a plane parallel with or substantially parallel with and laterally of or to one side of the plane or planes represented by the flat inner surfaces 23 and 28 of the blades 13 and 16, respectively. This parallel relation of the handles and blades, together with the gradual curves 33 in the shanks provides for full use of the power applied to the handles and the full advantage of the leverage gained through the shanks, to the blades, in a cutting operation. Additionally, it is noted particularly with reference to Fig. 1, that the member 10 beginning toward the rear end of the cutting edge 21 of the blade 13 and in the vicinity of the pivoted means 18 curves slightly upwardly or is bowed slightly upwardly or outwardly as at 34.

Additionally, in carrying this member inwardly through the curvature at 33, the same slightly overlaps that portion of the member 11 immediately rearwardly of the pivoted means 18 and to accommodate this relationship when the shears are closed or the blades of the shears are in closed relation the member 10 is relieved or cut away slightly as at 35. If desired, a pair of lugs 36 and 37 may be located on the inner sides of the shanks 12 and 15 in aligned relation so as to abut when the shears are closed and thus provide stops.

The loop or handle 14 of the member 10, in addition to a straight bar-like portion 38, which really comprises or may comprise an extension of the shank 12, includes the curved or loop portion 39 shown as beginning and ending rearwardly of the beginning and ending of the loop portion 40 of the handle 17, which handle, in addition to said loop portion, includes a straight bar-like portion 41 in effect comprising an extension of the shank 15. Thus, as is evident from Figs. 1 and 2, the handle 14 is located rearwardly from the blades and pivot with respect to the handle 17.

Additionally, the handle 14 is of such size as to receive not only the free or fore part of the thumb of an operator but also to receive the thenar eminence of the thumb. Thus, for the purpose of illustration, I have, in Figs. 1 and 4, shown an operator's hand, generally designated 42. Such hand includes the four fingers 43 and the thumb 44 and the portion 45 comprising the thenar eminence of the thumb. This is the innermost fleshy part of the hand over the inner portion of the bone or bones of the thumb and probably actually comprises a portion of the heel of the hand.

Additionally, the loop 17 is of a size to receive all four fingers of the operator's hand. Therefore, it will be seen that the operator may very effectively grasp the handles 14 and 17. He is not restricted to a small loop at 40, such as would only receive three of his fingers and not the index finger, and is not limited with respect to the handle 14 to the use of only the end or free part of his thumb. He passes the thenar eminence of his thumb into the handle or loop 39 and all four fingers through the loop 40 of the handle 17 and so is grasping the tool in such manner that the full strength of his hand may be used for its manipulation. The location of the loop 14 rearwardly of the loop 17, also provides for a better and more comfortable manipulation of the tool.

When using the tool for making a long cut or for cutting through a long piece of sheet metal, the tool is grasped as suggested in Fig. 1 and the members 10 and 11 pivoted back and forth on the pivoted means 18 to open and close the blades 13 and 16. As the cut is made into the metal, the cut is actually being made laterally of the handles 14 and 17 and so laterally of the operator's hands. Thus, the cut portions of the metal do not come in contact with the operator's hand and he does not run the risk of being cut or scratched by the newly several metal edge. Additionally, the cut piece of metal, as the shear is moved forward, rides up on the bow, curve or hump 34 and is directed upwardly so that it will not actually come into the immediate vicinity of the operator's hands.

It will be noted that the straight cutting edges 21 and 29 are parallel when the blades are closed, as in Fig. 5, and that these parallel edge portions of the blades overlap but slightly and that at their free ends the blades are relatively narrow owing to the tapered formations 22 and 32 of the outer edges of the blades. This being the structure, it will be appreciated that the present shear may be used for snipping short slots or slits in the edge portion of a piece of sheet metal without tearing or displacing of the metal. It will be seen that if the blades overlap to a great extent then when an attempt was made to cut a short slit, say ½" slit, into a piece of sheet metal if the shears were fully closed the largely overlapping blade portions would tend to push the metal out of place and especially if it was a soft metal would result in a tear leading inwardly from the inner end of the made slit. However, with the present structure of tapering blades there is very little overlap and very little height and overlap at the free end of the blade so a short slit may be cut without any such tearing of the metal, even though the latter be relatively soft. When cutting on a bench or the like, a flat and laterally enlarged portion 46 on the lower side of the handle portion 40 may be disposed against the bench. Then in the latter part of each cut, that is, as a cut is being completed by the free end portions of the blades, this flat lessens any tendency of the shear to wobble. Thus, the operator may apply his full strength to making the cut.

Having thus set forth the nature of my invention, what I claim is:

1. In a shear, a pair of crossed members each comprising a blade, a shank and a handle, the handles and blades being at the respective ends of said shanks, each of said blades having a flat inner side surface and a straight cutting edge at the inner edge of said surface, each of said blades having an outer edge comprising a transversely curved outer surface terminating in said flat inner side surface and in an outer side surface including a transversely curved portion terminating in said straight cutting edge, said blades each having an outer edge tapering outwardly and rearwardly from its free end substantially to its shank end and then tapered inwardly and rearwardly into its shank, said blades located with their flat inner sides in side-by-side relation and with their rearwardly and inwardly tapering portions in side-by-side relation, a pivot passing through said blades in their rearwardly and inwardly tapering portions and pivotally connecting said members, said shanks curving laterally and rearwardly from substantially immediately rearwardly of said portions through which said pivot passes to said handles whereby the latter are located laterally of said blades, and said handles extending from the rear ends of their shanks in substantially parallel relation with said blades.

2. In a shear, a pair of crossed members each comprising a blade, a shank and a handle, the handles and blades being at the respective ends of said shanks, each of said blades having a flat inner side surface and a straight cutting edge at the inner edge of said surface, each of said blades having an outer edge comprising a transversely curved outer surface terminating in said flat inner side surface and in an outer side surface including a transversely curved portion terminating in said straight cutting edge, said blades each having an outer edge tapering outwardly and rearwardly from its free end substantially to its shank end and then tapered inwardly and rearwardly into its shank, said blades located with their flat inner sides in side-by-side relation and with their rearwardly and inwardly tapering portions in side-by-side relation, a pivot passing through said blades in their rearwardly and inwardly tapering portions and pivotally connecting said members, said shanks curving laterally and rearwardly from substantially immediately rearwardly of said portions through which said pivot passes to said handles whereby the latter are located laterally of said blades, said handles extending from the rear ends of their shanks in substantially parallel relation with said blades, said handles comprising respectively a loop for receiving all the fingers of a hand of an operator and a loop for receiving the thumb of said hand, and said second mentioned loop located rearwardly of the first mentioned loop and of a size to receive the thenar eminence of the thumb of an operator and comprising a substantially flat straight inner bar of a length to have the thenar eminence of the thumb of the operator bear thereon.

PAUL FRANKO.

REFERENCES CITED

The following references are of record in the file of this patent:

UNITED STATES PATENTS

| Number | Name | Date |
|---|---|---|
| 8,680 | Heinisch | Mar. 11, 1835 |
| 539,525 | Lyon | May 21, 1895 |
| 1,137,687 | Wright | Apr. 27, 1915 |
| 1,357,437 | Baker | Nov. 2, 1920 |
| 2,250,638 | Kubinec | July 29, 1941 |